(12) United States Patent
Grelin

(10) Patent No.: US 9,358,731 B2
(45) Date of Patent: Jun. 7, 2016

(54) METHOD FOR MAKING A PREFORM

(71) Applicant: Hervé Grelin, Villeblevin (FR)

(72) Inventor: Hervé Grelin, Villeblevin (FR)

(73) Assignee: Techspace Aero S.A., Milmort (BE)

( * ) Notice: Subject to any disclaimer, the term of this patent is extended or adjusted under 35 U.S.C. 154(b) by 44 days.

(21) Appl. No.: 13/687,544

(22) Filed: Nov. 28, 2012

(65) Prior Publication Data

US 2013/0142988 A1 Jun. 6, 2013

(30) Foreign Application Priority Data

Dec. 1, 2011 (EP) ..................................... 11191540

(51) Int. Cl.
| | | |
|---|---|---|
| *B29C 70/00* | (2006.01) | |
| *B29C 70/02* | (2006.01) | |
| *B29C 70/46* | (2006.01) | |
| *B29C 70/54* | (2006.01) | |
| *B29B 11/16* | (2006.01) | |
| *B29C 70/08* | (2006.01) | |
| *B29C 70/20* | (2006.01) | |
| *B29K 101/12* | (2006.01) | |

(52) U.S. Cl.
CPC ............... *B29C 70/026* (2013.01); *B29B 11/16* (2013.01); *B29C 70/086* (2013.01); *B29C 70/202* (2013.01); *B29C 70/465* (2013.01); *B29C 70/543* (2013.01); *B29K 2101/12* (2013.01); *Y10T 428/24033* (2015.01)

(58) Field of Classification Search
CPC .. B29C 70/202; B29C 70/226; B29C 70/543; B29C 70/021; B29C 70/026; B29C 70/086; B29C 70/22; B29C 70/222; B29C 70/382; B29C 70/384; B29C 70/386; B29C 70/465; B29B 11/16; B29K 2101/12; D04H 13/003; Y10T 428/24033

USPC ............. 156/148, 155, 147, 145, 308.2, 245, 156/247, 93; 264/258
See application file for complete search history.

(56) References Cited

U.S. PATENT DOCUMENTS

| | | | | |
|---|---|---|---|---|
| 4,274,901 | A * | 6/1981 | Elber ............................ | 156/242 |
| 5,055,242 | A * | 10/1991 | Vane ............................. | 264/463 |
| 5,334,693 | A * | 8/1994 | Irwin ........................... | 528/185 |
| 5,520,995 | A * | 5/1996 | Fukushima ........... | B29B 15/105 |
| | | | | 428/213 |

(Continued)

FOREIGN PATENT DOCUMENTS

| | | |
|---|---|---|
| EP | 0873849 A2 | 10/1998 |
| EP | 1339534 A1 | 9/2003 |
| EP | 1907195 A1 | 4/2008 |
| EP | 1923192 A1 | 5/2008 |
| EP | 2090423 A1 | 8/2009 |
| WO | WO 0245932 A1 | 6/2002 |

OTHER PUBLICATIONS http://en.w ikipedia.org/w iki/Polypropylene; Aug. 30, 2010.*
Discussion of TFP Technology; Internet citation; Mar. 7, 2005; 11 pages; http://www.hightex-dresden.de./tfptech.pdf.

*Primary Examiner* — John Goff
(74) *Attorney, Agent, or Firm* — Reinhart Boerner Van Deuren P.C.

(57) ABSTRACT

The present invention relates to a method for making a preform for a composite with a thermoplastic matrix, said preform comprising one or several layers of reinforcement fibers sewn on a support by means of at least one attachment yarn and according to the TFP process, characterized in that the method comprises one or several steps for depositing a thermoplastic-resin layer on the support or on a layer of reinforcement fibers.

12 Claims, 1 Drawing Sheet

(56) References Cited

U.S. PATENT DOCUMENTS

| | | |
|---|---|---|
| 7,942,993 B2 | 5/2011 | Gessler et al. |
| 8,317,958 B2 | 11/2012 | Joern et al. |
| 2001/0030017 A1* | 10/2001 | Sato .............................. 156/199 |
| 2004/0074589 A1* | 4/2004 | Gessler et al. ................ 156/155 |
| 2009/0229761 A1* | 9/2009 | Joern et al. .................... 156/433 |
| 2010/0086727 A1* | 4/2010 | Katayama et al. ............ 428/102 |
| 2011/0151179 A1* | 6/2011 | Batge ...................... B29B 11/16 428/102 |

* cited by examiner

METHOD FOR MAKING A PREFORM

CROSS REFERENCE TO RELATED APPLICATIONS

This patent application claims priority to European Patent Application No. 11191540.1, filed Dec. 1, 2011, the entire teachings and disclosure of which are incorporated herein by reference thereto.

FIELD OF THE INVENTION

The present invention relates to a method for making a preform for a composite with a thermoplastic matrix. It relates more particularly to a method for making a preform according to the TFP process (Tailored Fiber Placement), comprising one or several steps for depositing a thermoplastic resin.

STATE OF THE ART

In aeronautics, a widely-used method for making composite-material parts is draping, which consists in stacking fabrics that are pre-impregnated with resin.

The draping of fibers, for example carbon fibers, is all the more efficient since the orientations used are not limited to the conventional angles of ±45°, 0° or 90°. In order to obtain these original drapings, unidirectional epoxy prepregs are conventionally used which are held into place by the tackiness of the non-crosslinked thermosetting resin.

For stackings with thermoplastic matrix, it is much more complicated to make drapings of unidirectional fiber since the plies have to be attached to each other. This is carried out either by using pre-consolidated plates, which then have to be thermoformed, or by attaching the plies to each other by means of welding points, causing local melting of the matrix. In both cases, once the plies are bound together, the structure is very difficult to shape by controlling the orientation of the fibers.

There is an alternative to the placement of fibers that does not use resin for holding the fibers into place. In this alternative, the fibers are sewn with a zigzag yarn that holds them in place relative to each other. In order to work, this method, called TFP (Tailored Fiber Placement) and schematized in FIG. 1, uses a substrate for ensuring the return of the yarns. The preform thereby made is then usually transformed into a composite by an impregnation/cross-linking process of the RTM type (Resin Transfer Molding). To this day, preforms are in majority impregnated with an epoxy resin, i.e. a thermosetting resin.

The TFP method is for example described in documents EP 1 339 534 B1 and EP 1 907 195 B1.

In EP 1 339 534 B1, the reinforcement fibers are sewn on a substrate by means of a chemically or thermally meltable attachment yarn. The melting of the yarn may occur during the impregnation and hardening process by chemical reaction with the resin used for the impregnation or under the action of heat during the impregnation and hardening process.

In EP 1 907 195 B1, a separation layer is positioned between the substrate and the fiber blank. This layer allows to remove the substrate more easily after making the preform. According to this document, the attachment yarns are also meltable by providing heat, but the melting step takes place before the impregnation and cross-linking step by the RTM process.

AIMS OF THE INVENTION

The present invention aims to provide an alternative to the existing methods, dedicated to the making of the composite parts with a thermoplastic matrix.

More particularly, the present invention aims to integrate the impregnation step into the TFP process for making the preform.

The present invention thus aims to make a preform impregnated with a thermoplastic resin which remains malleable.

MAIN CHARACTERISTIC ELEMENTS OF THE INVENTION

The present invention relates to a method for making a preform for a composite with a thermoplastic matrix, said preform comprising one or more layers of reinforcement fibers sewn on a support by means of at least one attachment yarn and according to the TFP process, characterized in that the method comprises one or more steps for depositing a thermoplastic resin layer onto the support or onto a reinforcement-fiber layer.

According to particular embodiments of the invention, the method comprises at least one or a suitable combination of the following features:

- the preform comprises an alternation of thermoplastic-resin layers and of reinforcement-fiber layers;
- the resin layer comprises thermoplastic yarns or a first thermoplastic film;
- the thermoplastic yarns are sewn on the support by means of the attachment yarn and, the first thermoplastic film is attached to the support or to a reinforcement-fiber layer by local melting;
- the reinforcement fibers within each layer are oriented in a same direction;
- the orientation and/or the nature of the reinforcement fibers is different from one layer to the other;
- the support is a second thermoplastic film, a composite fabric or a metal fabric;
- a third thermoplastic film is positioned on one face or on both faces of the support in composite fabric or in metal fabric;
- the attachment yarn is in carbon, glass, aramide, basalt, or thermoplastic resin;
- the attachment yarn has a melting temperature that is greater by 20°, and preferably by 40°, than the melting temperature of the resin forming the resin layer, or the attachment yarn is made of a resin of the same nature as the resin of the resin layer;
- the resin of the second and/or third thermoplastic film is of the same nature as the resin forming the resin layer;
- the thermoplastic yarns have the same orientation as the reinforcement fibers;
- the number of reinforcement-fiber layers and of resin layers within said preform is variable, depending on the shape to be made.

The present invention also relates to a method for making a composite part with a thermoplastic matrix comprising the steps of making a preform as described above and a step of heating said preform.

Finally, the present invention also relates to a composite part with a thermoplastic matrix which may be obtained according to the method described above.

SHORT DESCRIPTION OF THE DRAWINGS

KEY (1) Preform
(2) Support
(3) Reinforcement fiber
(4) Attachment yarn
(5) Thermoplastic resin
(a) As a film
(b) As yarns

DETAILED DESCRIPTION OF THE INVENTION

The present invention relates to a method for making a preform impregnated with thermoplastic resin. The preform thereby made may be used for making composite parts in any field of activity and, inter alia, for making aeronautical parts.

According to the present invention, impregnation with resin is carried out when the preform is being made.

Figure 1:
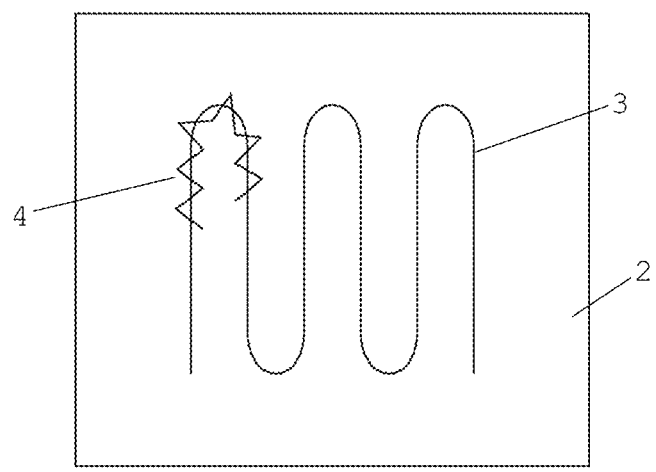
FIG. 1 shows in a known way, according to the TFP process, the step for attaching the reinforcement fiber by means of an attachment yarn sewn in a zigzag pattern on a support.
Figure 2:
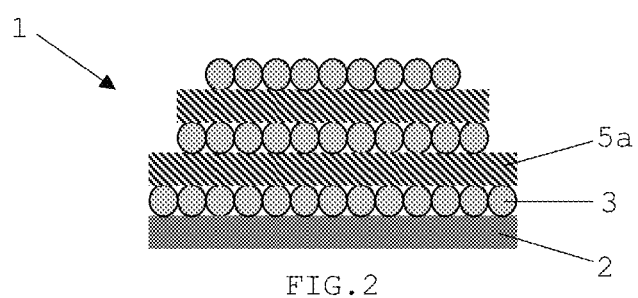
FIG. 2 shows a schematic sectional view of the preform according to a first embodiment of the invention. The preform comprises a substrate and an alternation of fiber-strand layers and of thermoplastic films.
Figure 3:
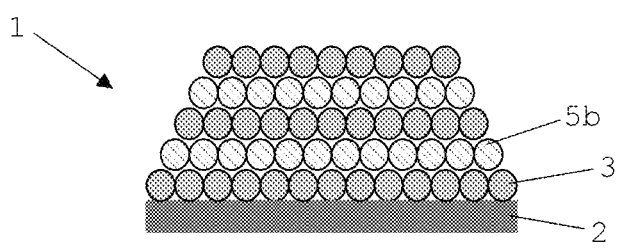
FIG. 3 shows a schematic sectional view of the preform according to a second embodiment of the invention. The preform comprises a substrate and an alternation of fiber-strand layers and thermoplastic yarns.

As illustrated in FIG. 1, the unidirectional dry fiber 3 is sewn with a zigzag attachment yarn 4 on a support 2 and this, in a known way according to the TFP process. Next, as shown in FIGS. 2 and 3, a thermoplastic resin layer 5a, 5b is deposited on the fiber layer 3. A layer of unidirectional dry fibers is then again deposited and sewn, the attachment yarn being re-stitched on the assembly of all the layers as far as the support. The layers of resin and of fiber are thus alternately deposited until the desired number of layers is obtained.

The resin layer may be presented as a thermoplastic film 5a, as in FIG. 2, or as thermoplastic yarns 5b, as in FIG. 3.

In the case of the film, the latter is cut out to the size of the ply of fibers to be impregnated. After the fiber ply is positioned by means of tools guaranteeing the position (jig, laser), the film is attached by means of hot spots.

In order to automate the method and not to have to bring back films with inherent placement problems, the film may be replaced by thermoplastic yarns that are sewn and maintained in place, just like the fiber. Thus, the fiber layer is sewn and the following layer of thermoplastic yarns is also sewn, and so forth. Preferentially, the thermoplastic yarns are positioned in a same direction as the reinforcement fibers.

In the examples illustrated in FIGS. 2 and 3, the last deposited layer is a fiber layer but it may also be a resin layer or possibly a protection. Equally, the first layer deposited on the support may be a resin layer or a reinforcement-fiber layer, and this depending on the nature of the support. Preferably, a resin layer alternates with a fiber layer but the present invention also discloses the case in which several fiber layers are deposited before one or several resin layers are deposited (or vice versa). It will also be specified that, depending on the shape to be made (e.g. the blade of a vane), the number of layers may also vary within a same preform.

After making the preform, the consolidation of the latter for making the composite part is carried out by a conventional compaction/compression method with heating and melting of the thermoplastic matrix.

The support of the preform may be a thermoplastic film. Preferably, the thermoplastic resin is the same as the one of the matrix in order to have perfect compatibility. Still preferably, the thermoplastic resin is a thermal high-performance resin such as PPS (polyphenylene sulfide), PEI (polyetherimide), PEEK (polyetherether-ketone), PEKK (polyetherketoneketone), etc. Alternatively, the support may be a composite fabric, a metal fabric or any other fabric allowing the return of the attachment yarn. According to this alternative and so that the support be completely firmly attached to the remainder of the produced part, the support is impregnated with plastic material, for example by placing a thermoplastic film over one or both faces of the support. The resin of the film is also preferentially of the same nature as the impregnation resin.

According to the present invention, the attachment yarns may be thermoplastic yarns of the same nature as the matrix of the composite. Alternatively, the attachment yarns are thermoplastic yarns having a higher melting point than the thermoplastic matrix so as to avoid the problem of melting and local mixing. Said melting point should be at least greater by 20°, preferably at least greater by 40°, than the melting temperature of the thermoplastic matrix. According to another alternative, the attachment yarns are glass, carbon, aramide (Kevlar®) or basalt yarns.

The reinforcement fibers may for example be carbon fibers or carbon-fiber strands. The nature of the fibers as well as the orientation of the fibers may be changed from one layer to the other.

ADVANTAGES OF THE INVENTION

The method according to the invention has the advantage of using a thermoplastic matrix while retaining a deformable preform.

The reliability and the reproducibility of this method is based on a controlled distribution of the resin and of the fibers. Good localization of the carbon fibers and of the resin in the form of yarns or films leads to a volume level and acceptable impregnation, and therefore to known and controlled mechanical properties.

The method according to the invention thus allows to make parts with a thermoplastic matrix with controlled and flexible draping in terms of fiber orientation (accuracy of the order of 1.5°).

The method according to the invention may be automated.

The production rate is greater than that of a method using the RTM process for impregnation and cross-linking since the cycle time including hardening is less for the method according to the invention.

The invention claimed is:

1. A method for making a preform for a composite with a thermoplastic matrix, said preform comprising a plurality of layers of reinforcement fibers alternating with a plurality of layers of thermoplastic resin, each of the alternating layers sewn according to a Tailored Fiber Placement (TFP) process, characterized in that the method comprises
   1) depositing a first layer consisting of reinforcement fibers onto a support;
   2) sewing a first attachment yarn across the first layer of reinforcement fibers and onto the support in a zig-zag pattern;
   3) depositing a first layer of thermoplastic resin consisting of thermoplastic yarns onto the first layer of reinforcement fibers;
   4) sewing a second attachment yarn across the thermoplastic yarns of the first layer of thermoplastic resin and across the first layer of reinforcement fibers and onto the support in a zigzag pattern;

5) repeating steps 1)-4) beginning by depositing a second layer consisting of reinforcement fibers onto the first layer of thermoplastic resin.

2. The method according to claim 1, characterized in that the reinforcement fibers within each layer are oriented in a same direction.

3. The method according to claim 1, characterized in that the orientation and/or nature of the reinforcement fibers is different from one layer to the other.

4. The method according to claim 1, characterized in that the support is selected from the group consisting of a third layer of thermoplastic resin, a composite fabric or a metal fabric.

5. The method according to claim 4, characterized in that a thermoplastic film is positioned on one face or on both faces of the composite fabric or the metal fabric.

6. The method according to claim 1, characterized in that the first and second attachment yarn is in carbon, glass, aramide, basalt or thermoplastic resin.

7. The method according to claim 6, characterized in that one or both of the first and second attachment yarns has a melting temperature greater by 20° than the melting temperature of the resin forming the first layer of thermoplastic resin or in that one or both of the first and second attachment yarn is made of a resin of the same nature as that of the first layer of thermoplastic resin.

8. The method according to claim 4, characterized in that the third layer of thermoplastic resin is of the same nature as that of the first layer of thermoplastic resin.

9. The method according to claim 1, characterized in that the thermoplastic yarns of the first layer of thermoplastic resin have the same orientation as the first layer of reinforcement fibers.

10. The method according to claim 1, characterized in that the plurality of layers of reinforcement-fiber and the plurality of layers of thermoplastic resin of said preform is variable depending on a shape of said preform.

11. A method for making a composite part with a thermoplastic matrix comprising the steps for making a preform according to claim 1 and a step for heating said preform.

12. The method according to claim 7, characterized in that the one or both of the first and second attachment yarns has a melting temperature greater by 40° than the melting temperature of the resin forming the first layer of thermoplastic resin, or the one or both of the first and second attachment yarn is made of a resin of the same nature as that of the first layer of thermoplastic resin.

* * * * *